Feb. 9, 1926. 1,572,272
O. EINSLER
AUTOMATIC MEANS FOR LETTING OFF STEAM FROM A
CONTAINER HAVING IN IT A BOILING LIQUID
Filed Nov. 25, 1924
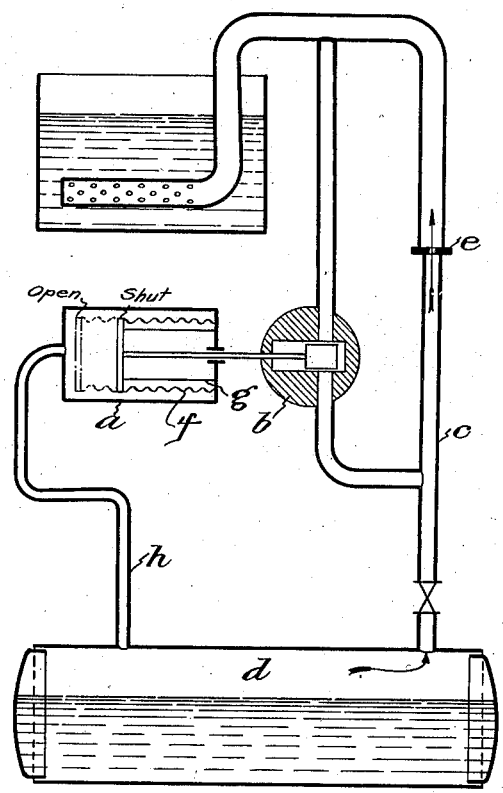

Patented Feb. 9, 1926.

1,572,272

UNITED STATES PATENT OFFICE.

OTTO EINSLER, OF LEVERKUSEN, NEAR COLOGNE, GERMANY, ASSIGNOR TO FARBEN-FABRIKEN VORM. FRIEDR. BAYER AND CO., OF LEVERKUSEN, NEAR COLOGNE-ON-THE-RHINE, GERMANY.

AUTOMATIC MEANS FOR LETTING OFF STEAM FROM A CONTAINER HAVING IN IT A BOILING LIQUID.

Application filed November 25, 1924. Serial No. 752,263.

*To all whom it may concern:*

Be it known that I, OTTO EINSLER, a citizen of Germany, residing at Leverkusen, near Cologne, State of Prussia, Germany, have invented new and useful Improvements Relating to Automatic Means for Letting Off Steam from a Container Having in It a Boiling Liquid (for which I have filed applications in Germany on August 22, 1923; in Austria on October 20, 1924; and in England on October 28, 1924), of which the following is a specification.

This invention has for its object a means for automatically controlling an auxiliary steam outlet valve on the fall of pressure in a container having in it a boiling liquid.

According to this invention a valve controlling member is connected to the container by a branch pipe, the control member being such that it operates to open the valve as soon as the pressure in the container becomes, with regard to the steam pressure in the steam outlet pipe, less than the critical low pressure, and operates to close the valve so soon as the critical low pressure is exceeded.

The critical fall of pressure may be defined as that difference of pressure which may exist between the steam in the container D, and that in the steam outlet pipe, without resulting in an excessive frothing of the liquid or in a portion of it being carried over or entrained in the escaping steam.

The invention is illustrated in the accompanying figure of the drawing.

Referring to this figure, $b$ is a valve connected with the steam outlet pipe $c$ from a container $d$ having in it a boiling liquid; $e$ is a throttle maintaining the velocity of the steam at the liquid level constant when the steam pressure falls off. $a$ is the means for controlling valve $b$.

The power transmitting member of control $a$ may be a membrane such as an elastic corrugated tube $f$, or a similar arrangement. $g$ is an abutment for limiting the movement of tube $f$, and $h$ is a pipe permanently maintaining the valve control $a$ at the pressure in container $d$. Tube $f$ is so constructed that when the pressure in container $d$ falls to a pressure corresponding to the critical pressure relation in front of and in rear of throttle $e$, it moves in the direction "open"; below this pressure limit, steam can pass through valve $b$. When pressure in container $d$ comes above this critical relation, tube $f$ moves automatically in the direction "shut" and comes against abutment $g$ and then prevents a flow of steam through valve $b$.

I claim:—

In combination with a vessel for containing boiling liquid, a main conduit connected with the top of the vessel for withdrawing steam therefrom, means in the said conduit a distance from the vessel, defining a permanent throttle, a by-pass connected to said conduit on opposite sides of the throttle and means responsive to the pressure within the vessel for controlling the flow of steam through the by-pass, said means being constructed and arranged to prevent flow of steam through the by-pass while the pressure within the vessel exceeds a critical limit, to allow unimpeded flow of steam through the by-pass when the pressure within the vessel drops below a lower critical limit and to vary the resistance to the flow of steam through the by-pass for pressures in the vessel, between said critical limits.

In testimony whereof I have hereunto set my hand.

OTTO EINSLER.